United States Patent
McCarty et al.

(10) Patent No.: US 8,938,711 B2
(45) Date of Patent: Jan. 20, 2015

(54) HEALTHCARE SERVICE INTEGRATION SOFTWARE DEVELOPMENT SYSTEM AND METHOD THEREFOR

(71) Applicant: Dell Products, LP, Round Rock, TX (US)

(72) Inventors: Dennis M. McCarty, Pennsauken, NJ (US); Christopher G. McNabb, Phoenixville, NJ (US)

(73) Assignee: Dell Products, LP, Round Rock, TX (US)

( * ) Notice: Subject to any disclaimer, the term of this patent is extended or adjusted under 35 U.S.C. 154(b) by 4 days.

(21) Appl. No.: 13/862,948

(22) Filed: Apr. 15, 2013

(65) Prior Publication Data

US 2014/0310683 A1    Oct. 16, 2014

(51) Int. Cl.
*G06F 9/44* (2006.01)
*G06F 3/0482* (2013.01)

(52) U.S. Cl.
CPC .............. *G06F 8/20* (2013.01); *G06F 3/0482* (2013.01)
USPC ........................................................ 717/105

(58) Field of Classification Search
None
See application file for complete search history.

(56) References Cited

U.S. PATENT DOCUMENTS

| | | | |
|---|---|---|---|
| 2010/0241403 A1* | 9/2010 | Jakobsen et al. | 703/1 |
| 2013/0198713 A1* | 8/2013 | Zhang et al. | 717/106 |
| 2013/0332899 A1* | 12/2013 | Stewart et al. | 717/121 |
| 2013/0339925 A1* | 12/2013 | Nucci et al. | 717/105 |

* cited by examiner

*Primary Examiner* — Philip Wang
(74) *Attorney, Agent, or Firm* — Larson Newman, LLP

(57) ABSTRACT

A method includes providing a graphical user interface to an automated software development system, and providing a customized software application to an enterprise. The application comprises a collection of codesets that together are configured to perform an integration process. The system provides a configuration dialog interface for soliciting, from a user, information indicating a Health Level Seven (HL7) version and an HL7 message type. The system determines an HL7 electronic data interchange document profile defining a document schema and a set of data elements included at an HL7 message document corresponding to the HL7 version and the HL7 message type. The system generates a profile codeset based on the HL7 document profile. The system provides the customized software application for installation at an enterprise, the application comprising a collection of codesets including the profile codeset.

20 Claims, 9 Drawing Sheets

US 8,938,711 B2

HEALTHCARE SERVICE INTEGRATION SOFTWARE DEVELOPMENT SYSTEM AND METHOD THEREFOR

FIELD OF THE DISCLOSURE

This disclosure generally relates to information handling systems, and more particularly relates to a healthcare service integration software development system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems. Today, most business enterprises have sophisticated computing systems that are used both for internal operations, and for communicating outside the enterprise's network.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Figure 1:
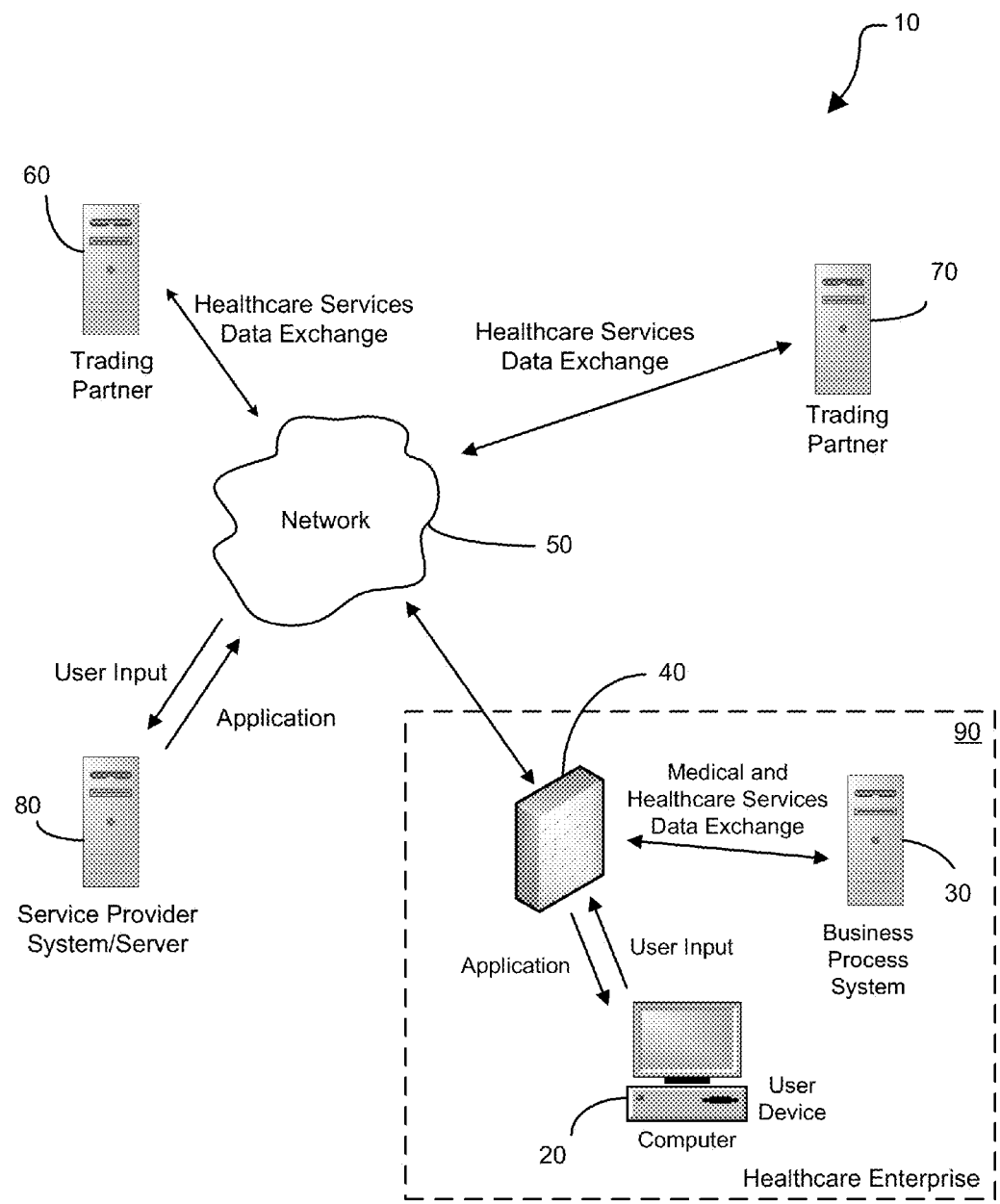
FIG. 1 is a block diagram illustrating a distributed business network system according to an embodiment of the present disclosure.

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings may be utilized in this application, as well as in other applications and with several different types of architectures such as distributed computing architectures, client or server architectures, or middleware server architectures and associated components.

Today, most healthcare service providers have computing systems that are used for facilitating internal operations and for communicating outside the provider's network, for example to exchange patient information with other healthcare enterprises. Much of present day information exchange is conducted electronically via communications networks, both internally to the enterprise and among trading partners, such as other health care service providers. Information, such as patient medical records, is thus exchanged between distinctly different computing systems, computer networks, software applications, and the like. The enabling of communications between diverse systems or networks or applications in connection with the conducting of business processes is often referred to as business process integration.

Systems have been established to enable exchange of data via the Internet, such as via web-based interfaces for business-to-business and business-to-consumer transactions. For example, a physician may operate a personal computer (PC) to connect to a pharmacy's website to manually enter a patient's prescription information using a web interface provided by the seller's computing system. In higher volume environments, an enterprise may use an executable software application known as Electronic Data Interchange (EDI) Software, or Business-to-Business Integration Software to connect to a trading partner's computing system and to deliver electronically a document, such as patient medical records, without requiring human intervention to manually enter the data.

Electronic Data Interchange applications are typically purchased from software vendors and installed on a computerized system owned and maintained by the business, in this example a healthcare enterprise. A trading partner, such as another healthcare service provider, will have a similar or complementary software application on its system, so that the information exchange may be completely automated in both directions. In contrast to the system presently disclosed, these applications are purchased, installed and operated on the user's local system. Thus, the user typically owns and maintains its own copy of the system, and configures the application locally to connect with its trading partners.

In both the traditional and more recent approaches, the executable software application is universal or generic as to all trading partners before it is received and installed within a specific enterprise's computing network. In other words, it is delivered to different users or systems in an identical, generic form. The software application is then installed within a specific enterprise's computing network, which may include data centers located outside the physical boundaries of the enterprise. After the generic application is installed, it is then configured and customized to interact with specific trading partners. The customized application can be executed to exchange data between the specific trading partner and the enterprise. Accordingly, the software application will not be customized for any specific enterprise until after that enterprise installs the software application at their computing network and configures the software application for the specific requirements of the enterprise's computing network and of their trading partners. Alternatively, the enterprise may engage computer programmers to create a customized software application to meet these requirements, which is often exceptionally time-consuming and expensive.

FIGS. 1-9 illustrate a system and method for automating development of customized system integration application programs for facilitating the exchange of information between health care service providers and associated medical applications. An application program created using the system and methods disclosed herein is configured to implement a system integration process that can exchange medical related documents compliant with the Health Level Seven (HL7) standard. In particular, the automated software development system disclosed herein provides a web-based graphical user interface (GUI) permitting a user to model a system integration process using a flowcharting process. During this modeling process the user selects from a menu of visual elements, placing the selected element at a process development window at the GUI. Each visual element represents a component that, when interconnected with other components, define a desired integration process. Each visual element can be accompanied by one or more dialog interfaces through which the user can configure specific operation of the component. For example, an enterprise can define an integration process to enable exchange of healthcare records between internal software applications, and between internal applications and external trading partners. The system and methods disclosed herein facilitate development of system integration processes that comply with the HL7 standard and protocols.

HL7 is an organization involved in the development of international healthcare informatics interoperability standards. HL7 provides a framework and related standards for the exchange, integration, sharing, and retrieval of electronic health information. The HL7 standard defines a series of electronic messages to support administrative, logistical, financial as well as clinical processes and medical workflows. For example, a hospital can request and receive a patient's medical records from the patient's physician, and transmit diagnostic records to an insurance company using HL7 compliant EDI documents. By enforcing standardized document syntax, HL7 has allowed for the interoperability between electronic Patient Administration Systems (PAS), Electronic Practice Management (EPM) systems, Laboratory Information Systems (LIS), Electronic Medical Record (EMR) systems, Electronic Health Record (EHR) systems, and the like.

Today, the HL7 standard has been adopted by essentially all healthcare service enterprises. Therefore an integration process for exchanging medical information with medical services trading partners should comply with standard syntaxes and protocols promulgated by committee. In addition to specifying a format and syntax of a message, the HL7 standard specifies protocols that should be administered. For example, one important part of the HL7 standard is the acknowledgement protocol. Every time an application accepts a message and consumes the message data, the application is expected to send an acknowledgement (ACK) message back to the sending application. Similarly, the sending application is expected to keep sending a message until it has received an ACK message confirming receipt of the message. The ACK message identifies the sending and receiving applications and contains a Message Control ID of the received message. The ACK message can further identify whether the message was accepted or rejected. A large portion of HL7 messaging is transported by the Minimal Lower Layer Protocol (MLLP). For transmitting via Transmission Control Protocol and Internet Protocol (TCP/IP), header and trailer characters are added to the HL7 message to identify the beginning and ending of the message. During operation, an integration process can continuously listen for incoming HL7 messages and process the messages accordingly.

The automated software development system disclosed herein generates custom software to provide the desired interoperability as defined by an integration flowchart. The custom software may be packaged within a container program, also referred to herein as a dynamic runtime engine. The dynamic runtime engine may be an executable software application capable of running on a computer within the enterprise's network, which may include, for example, networks owned and/or operated by third party data center providers. When started by a user, the executable software application connects to the automated development system and downloads an Extensible Markup Language (XML) representation of the visual model representing the integration process, and all requisite code needed to run the integration process. The required code includes a generic application template, selected predefined code sets that are selected as a function of the user's needs as defined by the modeled process, and a data code set that includes input provided by the user for customizing the stock components for a specific integration process. Additional components may be retrieved as required. As changes are made to this model, via the website, or to the code that executes the model, the executable software application will automatically check for and apply these changes as needed without requiring human intervention. The website interface of the automated software development system supports testing of an integration process model prior to generating the dynamic runtime engine.

FIG. 1 shows a distributed business network 10 including conventional information handling systems of a type typically found in client/server computing environments. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router, wireless router, or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

More specifically, the business network 10 includes a conventional user/client device 20, such as a desktop PC, enabling a user to communicate via a communications network 50, such as the Internet. The exemplary user device 20 may be configured with conventional web browser software. The web browser allows the user to interact with websites via the network 50. In an embodiment of the present disclosure, the client device 20 is positioned within a network associated with a healthcare enterprise 90, with the network located behind a network firewall 40. For illustrative purposes, the enterprise 90 represents a healthcare service provider. The network at the enterprise 90 includes a business process system 30, which may include conventional computer hardware and commercially available Enterprise Resource Planning (ERP) and other business process software applications. The business network 10 further includes trading partners 60 and 70 associated with other healthcare service organizations with whom the enterprise 90 interacts. For example, the trading partner 60 may represent a laboratory that provides medical diagnostic services to the enterprise 90. During a typical transaction, the enterprise 90 can transmit an inquiry for patient records to the trading partner 60, and in response to the inquiry, receive the requested records from the trading partner 60. In an embodiment of the present disclosure, these transactions comply with the HL7 standard.

The network 50 can support the exchange of other information in addition to medical-related documents such as invoices, purchase orders, personnel records, and the like. Accordingly, software generated using the system and methods disclosed herein can implement business processes to facilitate the electronic exchange of many types of data with one or more trading partners, internal applications, or applications available via the Internet, commonly referred to as Software as a Service. Any information that is communicated between organizations in a high volume and redundant manner is a candidate to be automated using integration software such as this. The present disclosure provides these capabilities in a unique fashion by providing the enterprise with a software application including the configuration information required for conducting the integration process, and also the executable code needed to make the process run, and specially-configuring this application to run within the enterprise's network, for example, behind the firewall of the enterprise or within a third-party-hosted data center, etc., that is considered to be part of the enterprise's network so that it may connect to various software applications running internal to the enterprise's network.

In accordance with the present disclosure, a service provider facilitates creation of customized software applications as defined by a user or customer of the service. The service provider operates a system 80 within the business network 10. The system 80 may be specially-configured in accordance with the present disclosure, and may be capable of communicating with devices at the network at the enterprise 90. It should be noted that the communication between the system 80 and the enterprise 90 is essentially unidirectional in that communications/communication sessions originate from the network at the enterprise 90, and not from the system 80. Accordingly, the enterprise 90 need not modify the firewall 40 to allow incoming traffic from communications sessions originating from the system 80.

Figure 2:
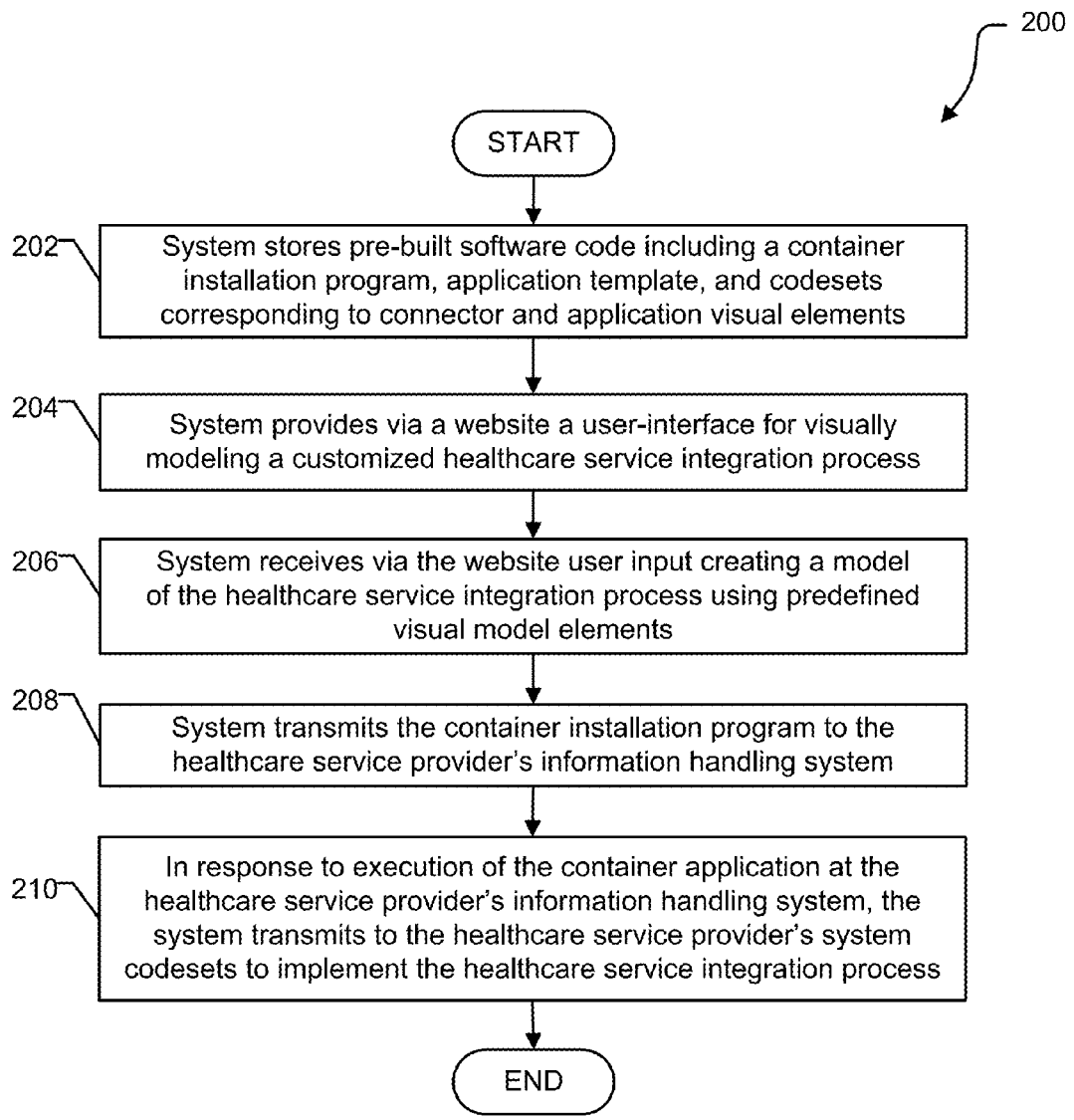
FIG. 2 is a flow diagram illustrating a method for automating creation of a customized software application according to an embodiment of the present disclosure.

FIG. 2 shows a method 200 for automating creation of a customized software application according to an embodiment of the present disclosure. The method begins at block 202 where pre-built software code is stored at the development system. For example, the service provider system 80 is specially-configured in accordance with the present disclosure to store pre-defined datasets in its memory. Such data includes a pre-defined container installation program, referred to herein as a dynamic runtime engine, application templates, and codesets associated with process elements. After a user has defined and tested an integration process using the automated software development system using a web interface at the system 80, the dynamic runtime engine application can be downloaded to a system at the enterprise 90. Execution of the application at the enterprise 90 results in the installation of software custom-configured to implement the specified integration process. The application template is preferably provided in the form of an XML representation of the execution steps to be carried out by the customized software application, which in this example provides business process integration functionality, as modeled by the user, using a provided graphical user interface.

The application template includes references to specific pre-built software code stored on the system 80, and references to how the pre-built code should be configured for execution within an enterprise's computing network, or other network of choice. The integration process can provide for exchange of business integration data between the enterprise's computing system(s) within the enterprise's network, and/or between the enterprise's computing system(s) and trading partners' systems external to the enterprise's network, and/or between the enterprise's internal computing system(s) and the enterprise's computing systems external to the enterprise's network, commonly referred to as Software as a Service (SaaS). For example, the application template may be constructed as an integration of customer data between Salesforce.com and SAP using Java programming technology.

The application template corresponds to the modeled integration process, but is not itself configured for use with any particular enterprise, or any particular trading partner. Accordingly, the application template is not yet ready for execution to provide business integration functionality for any particular trading partner or enterprise. Instead, the application template requires additional code and/or data to be so configured. Preferably, the application template has a conceptual design that is modular in nature, and thus permits it to function with any selected ones of several different additional components, as discussed below. The dynamic runtime engine installation program, the dynamic runtime engine program and the application template may be used by different enterprises/customers of the service provider.

Documents that are read into or sent out of a business process can be associated with a document profile. A document profile may be referred to as a data profile, and the terms are used interchangeably herein. A data profile associated with a document, or with a software application as a whole, defines the names of data fields included in the document and other format information. For example, a data profile can provide a schema that defines a format, syntax, layout, or other relevant structure of a document, such as of an EDI document. A data profile also can provide a schema that defines an Application Programming Interface (API) of a software application. Furthermore, a data profile can define delimiters or column positions, data types, minimum/maximum string lengths, and the like. To provide interoperability and error-free exchange of healthcare information between healthcare service providers, HL7 messages must adhere to rigorous format and syntax requirements promulgated by the HL7 standard. However, an enterprise can specify customized HL7 profiles that are associated with particular trading partners. For example, an enterprise may exchange information corresponding to only a subset of available HL7 message types with a particular trading partner. Furthermore, an HL7 message can include optional data fields and trading partners can agree to implement a subset of data fields for particular message types. Data profiles can be used by the customized software application to parse and identify errors at incoming HL7 messages and to properly format outgoing messages.

Profiles also are used in association with document translation processes, often referred to as data maps. Data maps describe how information can be transferred from one document to another. For example, to transfer information contained in an HL7 message into a custom XML document or to transfer information included at an XML document to a flat file, the format of each document can be encoded using a respective data profile. Additionally, an application can use a data profile to inspect a corresponding document. Accordingly, a data maps include a source data profile, a destination data profile, and mapping information indicating a correspondence between each fields of the source data profile and a respective field of the destination data profile.

The pre-built software code includes data profile codesets corresponding to each profile included at an integration process model. A data profile is needed specifically when the data being sent/received must be parsed, have its contents examined programmatically, or otherwise be processed by the container application, such as when data is routed based on the value of a particular field, or when a piece of data is transformed from an XML format, for example, to a flat file format. A data profile codeset may be stored in a database as a combination of executable software code and XML documents containing configuration information about the usage of the data profile codeset. A data profile codeset may describe the originating format and structure of certain data to be integrated, the destination format and structure of such data, a data map for retrieving data from certain fields in a source document and inserting it into a certain field in a destination document, and the like. For example, data profile and a data map can be used to translate an HL7 message into another document format suitable for storage at a hard drive. The data map can identify where certain data in the source document must appear in the destination document, etc. Each data profile codeset is associated with a specific data element to be integrated. The data profile codesets may be used by different enterprises/customers of the service provider.

The pre-built software code further includes connector codesets. Each connector codeset includes code for communicating with a specific software application or system. For example, the connector codesets may be stored in a database as a combination of executable software code and XML containing configuration information about the usage of the connector codeset. Each connector codeset is configured to provide connectivity to specific software applications, databases and/or systems. Each connector codeset is specially-configured to enable communication with the application, etc. in the proprietary API utilized by that application and/or system.

Each connector codeset is associated with a visual connector element that abstracts away the technical details of how this communication occurs, greatly simplifying the process of communicating with the target application or system. Accordingly, a user can visually configure the connector element, and thus the associated connector codeset, by entering simple values into a dialog box within the software development application, thus avoiding a need to write computer code and understand the underlying proprietary protocol being used. This permits a layperson to use the application to create a customized software application, without the need for a computer programmer.

Preferably, a respective connector codeset is provided for each commercially available and/or known software application/system. For example, the development system provided at the system 80 includes connector codesets for communicating with other HL7 compliant systems. During configuration of a customized system integration application program, a user utilizes the menu interfaces to customize operation of the connector. From a user's perspective, these connectors can represent trading partners with whom healthcare records can be exchanged, for example the trading partners 60 and 70. As used herein, an MLLP server is configured to listen for incoming HL7 message transmissions and a MLLP client is configured to transmit HL7 messages to another trading partner. In addition, connector codesets may be used to communicate between different application software/systems within a single enterprise system, as discussed in greater detail below, or they may be used to insert or extract data for exchange with an external trading partner. Accordingly, the connector codesets are conceptually modular in that a corresponding connector codeset may be selected for use in conjunction with the application template to provide a customized software application for exchanging data with specific software applications/systems. Further, the connector codesets may be used by different enterprises/customers of the service provider.

The system 80 is specially-configured in accordance with the present disclosure to store in its memory a trading partner codeset for each of several different trading partners. The trading partner codesets may be stored in a database or otherwise in a memory of the system 80, as various XML documents, each including respective data for each of a plurality of different trading partners. For example, there may be an XML document including information for communicating with the trading partner 60. The document may include respective communication parameters relevant for the respective trading partner, such as an identification of the Internet protocol to be used for communication, such as TCP/IP, FTP, and HTTP, an applicable security standard to be complied with, such as Applicability Statement 2 (AS2), an applicable URL or other network address information to be used for communication. Other parameters can be included in the document, such as electronic data interchange (EDI) parameters, formats, an Interchange Id, an Application Id, Primary and Secondary contact information, and the like. The trading partner codesets are conceptually modular in that any selected trading partner codeset, such as an XML document, may be selected for use in addition to the application template to provide a customized software application for exchanging data with the trading partner. The trading partner codeset may be used by different enterprises/customers of the service provider.

The system 80 is further specially-configured in accordance with the present disclosure to provide web server functionality for presenting a user-accessible website, as shown at block 204 of FIG. 2. Communications between the user device 20 and a website at the service provider's system 80 may be performed using conventional communications technologies, such as the HTTPS protocol. The website is specially-configured to provide a graphical user interface providing a visual designer environment permitting a user to define process flows between applications/systems, such as between trading partner and enterprise systems, to model a customized business integration process. The graphical user interface may be used by different enterprises/customers of the service provider.

The interface provides a menu of pre-defined user-selectable visual elements, and permits the user to arrange them as appropriate to model a process. The elements may include visual, drag-and-drop icons representing specific units of work required as part of the integration process, such as invoking an application-specific connector, transforming data from one format to another, routing data down multiple paths of execution by examining the contents of the data, business logic validation of the data being processed, etc. Information and computer executable instructions for presenting such a graphical user interface are stored in a memory of the system 80.

At block 206, a user can select and arrange these visual elements using the graphical user interface at the website provided by the system 80. The graphical user interface allows the user to provide user input, such as information relating to trading partners, activities, enterprise applications, enterprise system attributes, and/or process attributes that are unique to a specific enterprises end-to-end business integration process. For example, the graphical user interface may provide drop down or other user-selectable menu options for identifying trading partners, application connector and process attributes/parameters/settings, and the like. Dialog boxes facilitate providing textual entries by the user, such as to describe the format and layout of a particular data set to be sent or received, for example an HL7 message.

XML representations of the model and the information provided by the user are stored by the system 80 in association with the user's/enterprise's account. This allows this information to be stored, retrieved, modified, transmitted, etc. Information provided by the user that relates to the enterprise system may optionally be saved by the system 80 for subsequent use by the user in modifying the customized application software, or for developing customized application software for integrating other business processes. Trading partner data not previously stored by the system may be gathered by prompting the user to supply such information via the website interface, and that such gathered information may subsequently be saved by the system 80 for subsequent use by the same or other users.

Figure 3:
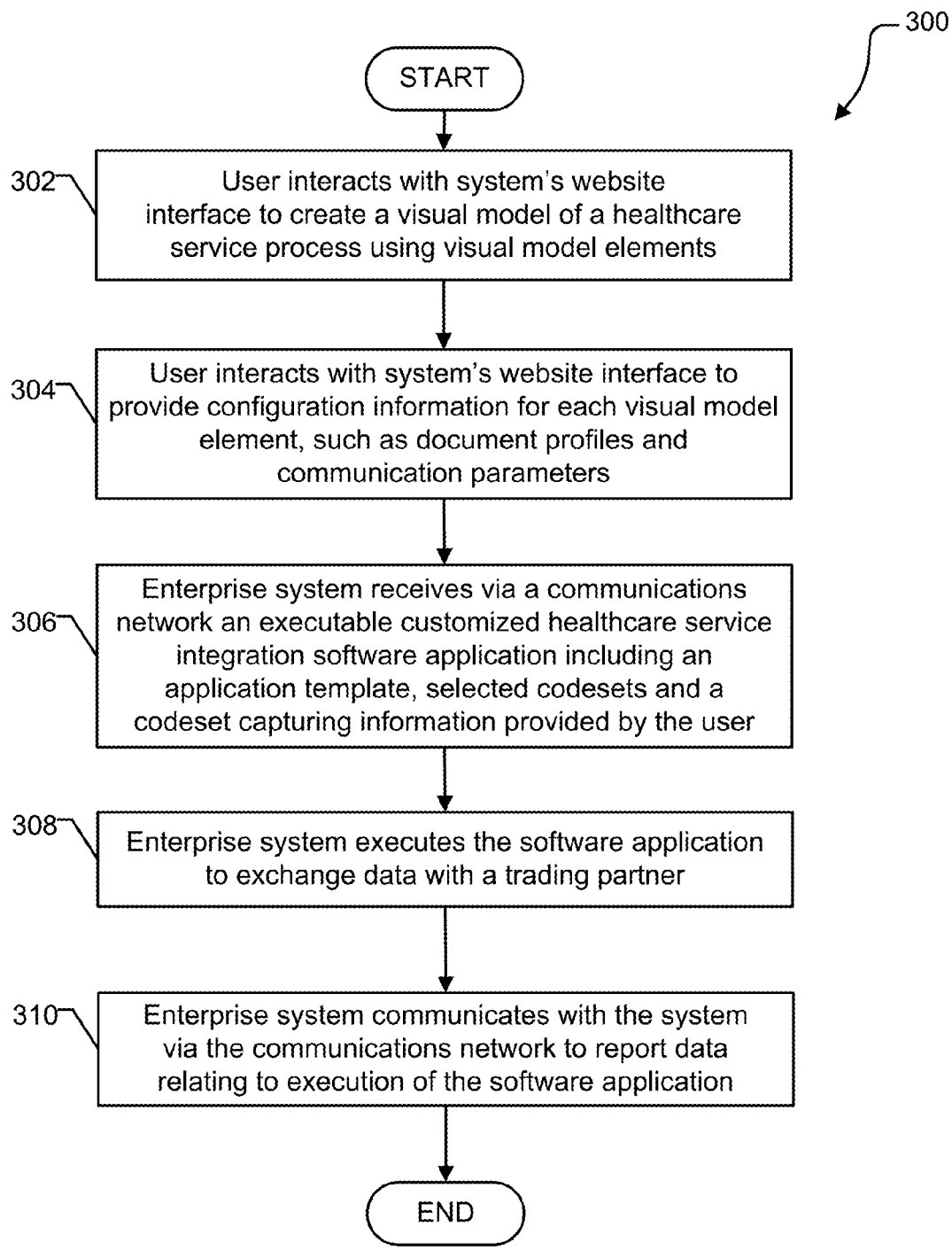
FIG. 3 is a flow diagram illustrating the method of FIG. 2 from the point of view of a user of an automated software development system according to an embodiment of the present disclosure.

FIG. 3 shows a method 300 for automated, on-demand creation of a customized software application in accordance with an embodiment of the present disclosure, shown from a user's perspective. The method begins at block 302 where a user interacts with the website interface of the system 80. The user can interact with the website using Microsoft's Internet Explorer or a similar web browser, and conventional hardware/software for browsing and interacting with websites. The user interacts with the website to build a visual model of business process activities to be automated by selecting predefined business process elements from a menu of generic business process elements displayed via the interface, as described above.

Further, the user interacts with the website to provide user input providing enterprise-specific or process-specific parameters, settings, data, attributes, and the like for customizing the generic business process element to the specific business process of a specific enterprise, as discussed above, as shown at block 304. The user can continue to utilize the system 80 to create new integration processes, and can deploy the integration process to the same dynamic runtime engine previously installed, or setup a new dynamic runtime engine for the new integration process to be downloaded and installed in.

After the integration process has been modeled to meet the requirements of the enterprise, the enterprise system receives via the network a dynamic runtime engine installation program, download of which is initiated by the user. Upon execution of the installation program by the user, a dynamic runtime engine application is installed. Execution is initiated in a conventional manner, such as by invoking a Start command from the menu of the operating system where the installation program has been installed. This application is installed by the user in the same network at the enterprise 90 in which the applications to be integrated reside. In an embodiment, the runtime engine is executed as a system service and can be automatically initiated by the operating system each time a corresponding host system is energized.

Upon execution of the dynamic runtime engine program within the user's network, for example at the user device 20 or at the business process system 30, the dynamic runtime engine connects to the service provider's system 80 via the network 50, and initiates download of software components from the system 80 that collectively will provide an executable customized process-specific automated business integration software application. More specifically, the dynamic runtime engine initiates transmission from the system 80 to the network at the enterprise 90 of the generic application template and the codesets that have been selected (see FIG. 2, step 210) because they are associated with the elements of the model built by the user, or are referenced by the codesets associated with the elements of the model. Further, the dynamic runtime engine initiates transmission from the system 80 to the enterprise network of a codeset capturing enterprise/process-specific information provided by the user, for example to configure the generic elements with enterprise/process-specific parameters, attributes, settings, etc. These software components are transmitted from the system 80 to the enterprise 90, for example to the user device 20 or to the business process system 30 behind the firewall 40 at FIG. 1. These software components may be transmitted in the form of one or more data files using conventional file transfer technologies, such as HTTPS or FTP.

Accordingly, the dynamic runtime engine downloads to the enterprise's network XML documents including the attributes, settings parameters, etc. provided by the user when modeling the process, which are captured by the application template and the appropriate connector, trading partner and/or data profile codesets for a specific integration process. For example, this may include the trading partner attributes of the partner being connected to, data transformation rules, data format layouts, business logic rules, specific error handling routines, etc. The enterprise network receives this data, as shown at block 306. At this point the software components collectively provide the customized software application is ready for execution to exchange data. The application may run in an automated manner without requiring any human intervention.

The enterprise system then executes the customized software application by executing the application template, as shown at block 308. Accordingly, when the application template is executed, the combination of the application template, the downloaded pre-built XML documents corresponding to the process modeled by the user, and the XML documents capturing user input provided during modeling of the process, are executed to provide a customized business process integration software application. When the dynamic runtime engine executes a particular customized integration process, the enterprise 90 transmits and/or receives data, in this example with the trading partner 60. For example, medical records may be retrieved from a data storage device at the system 30 by the integration process, where it is transformed during execution of the integration process into an HL7 message format required by the trading partner 60, and is then transmitted to the trading partner 60 via the network 50. In turn, the trading partner 60 receives this data using their own HL7-compliant integration software.

Subsequent to installation at an enterprise, the customized software application can be configured to report the results of all processes executed as they complete to the service provider's system 80, as shown at block 310. The user may then connect to the system 80 using a web browser via a device such as the device 20 to view the status of the dynamic runtime engine executions. Such information may include the status of a particular process execution (success, failure), how many documents were processed, how the long the process took to run, etc. Only reporting information is transmitted from the enterprise system to the system 80, not the actual data being processed. The service provider can receive error reports, operational logs, and the like to facilitate customer support, troubleshooting, etc.

In an embodiment, the customized application may be configured to be "self-updating." More specifically, the dynamic runtime engine application is configured to check for components it requires to automate the modeled business process, and to automatically initiate download of any updated component on the server newer than a corresponding component resident at the enterprise network, thus updating the application. Accordingly, the dynamic runtime engine is configured to connect to the system 80 to download both application settings for the application template as well as additional software components.

Further, the dynamic runtime engine application can be configured to check for a new/revised model of a process, for example as a result of a user's operation of the system 80 to retrieve, modify and save a previously constructed business process model, and to retrieve any additional, new or modified components from the server that are newer than a corresponding component resident at the enterprise network, thus maintaining the application. Accordingly, as new versions of software components running inside the dynamic runtime engine are available, the dynamic runtime engine will download and apply those updates from the system 80 without requiring any human intervention.

Accordingly, after the system 80 is initially established, the system 80 can be used repeatedly by a single enterprise to model and automate various different business processes, or by various different enterprises with various different enterprise system attributes and each enterprise can model, and subsequently use, an appropriate customized software application that is custom-tailored to its specific needs. Further, such customized applications can be developed on-demand, as needed, in real time, and without the need for programmers or programmer expertise, etc. Instead, the system exists as a website accessible for use, essentially at will, subject to any applicable subscription, service level or other access restrictions.

Figure 4:
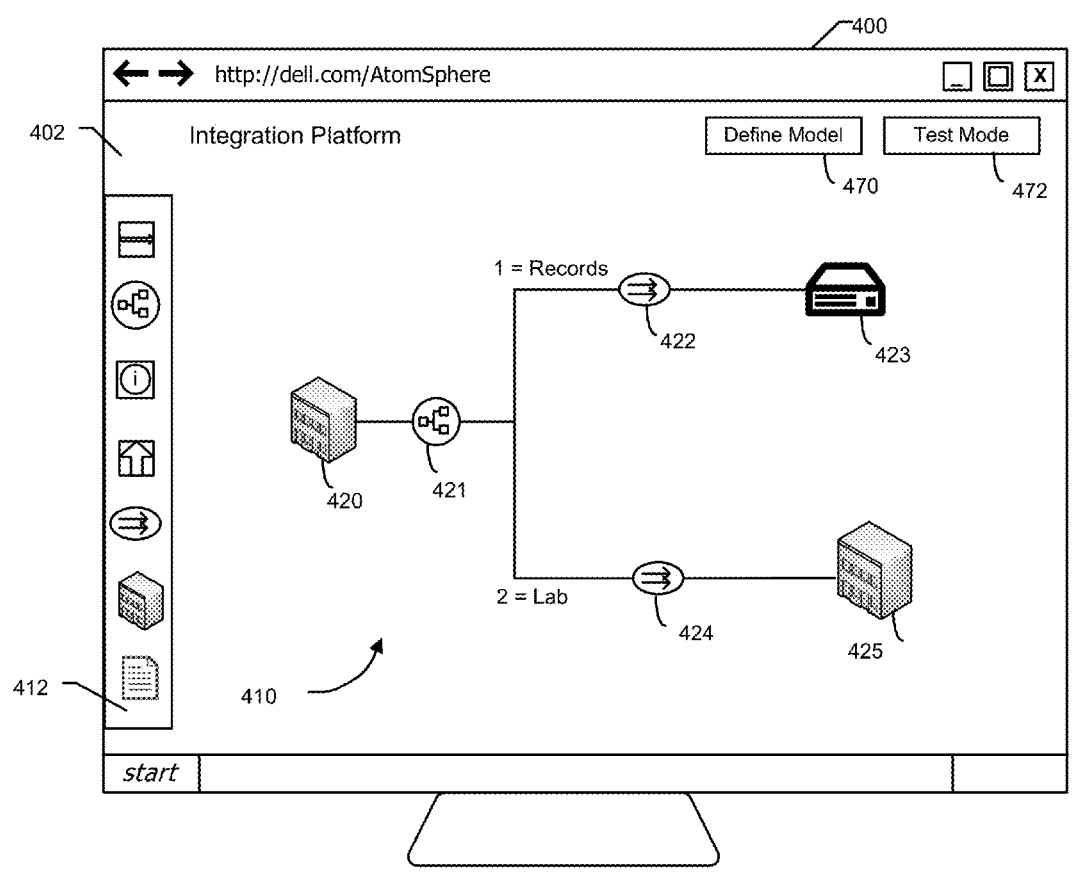
FIG. 4 illustrates a graphical user interface for developing a system integration application program according to an embodiment of the present disclosure.

FIG. 4 shows a graphical user interface (GUI) 402 of an automated software development system displayed at a web browser window 400 according to an embodiment of the present disclosure. GUI 402 displays an exemplary healthcare service process integration model 410 in the form of a flow diagram modeling a healthcare service integration process. The visual model can be created by a user within the visual designer environment, via the website interface provided by the system 80. GUI 402 can include graphical buttons, such as buttons 470 and 472 that are associated with respective modes of operation. For example, the button 470, when selected by a user, can configure the graphical user interface to display the model definition screen presently displayed at the graphical user interface of FIG. 4. The button 472, when selected, configures the interface to provide a test environment and associated features applicable for verifying operation of the process integration model 410. GUI 402 illustrated at FIG. 4 is simplified for clarity. One skilled in the art will appreciate additional menus, dialog boxes, buttons, and the like, can be provided. In addition, the interface can be dynamically customized to support alternate functionality, such as parameter configuration, testing, code generation, and the like, that is relevant to particular stages of development of the process model 410.

The visual model is created by selecting visual elements from a menu 412 and placing the elements at GUI 402. The elements are then interconnected to provide a flow diagram representing a desired process integration model. The flow diagram of FIG. 4 includes an inbound connector element 420, a routing element 421, data transformation process elements 422 and 424, a data storage device element 423, and an outbound connector element 425. The elements generally require configuration by the user, however a library of pre-configured process components/steps can be provided for particular process functions. For example, the inbound connector element 420 may be configured to receive HL7 messages from another healthcare service provider. Upon selection of the inbound connector element 420 and instantiation of the element at the GUI 402, one or more configuration dialog boxes or forms are displayed at GUI 402 to solicit configuration information from the user. The inbound connector element 420, in combination with any required configuration information, can be associated with a corresponding connector code set stored in the memory of the system 80.

The outbound connector elements may be similarly configurable. For example, the last step of the integration process may involve sending a response to a trading partner acknowledging receipt of an HL7 message received at the inbound connector element 420. The acknowledgement message can be sent to the outbound connector 425, and the outbound connector can convert the message from an internal format, such as XML, into an HL7 compliant format that can be understood by the recipient. The routing element 421 and the data storage device element 423 may require additional configuration by a user of the integration platform. As referenced above, the website interface may provide menus, dialog boxes or other input-receiving fields or devices permitting textual or other entries by the user to provide information, parameters, settings, attributes, and the like, that are specific to a certain enterprise, trading partner, process, etc. This information can be provided as properties or attributes of one of the visual modeling elements. For clarity, the integration process shown at FIG. 4 includes only a few elements; however one skilled in the art will appreciate that a typical business process likely includes additional processing elements. Configuration of the inbound connector element 420 and the outbound connector 425 are described below with reference to FIGS. 5-8.

After storing the completed model, the system 80 can transmit the dynamic runtime engine installation program stored in its memory to the enterprise system 90, for example to the user device 20, as shown at block 208 of FIG. 2. As discussed above, execution of the dynamic runtime engine installation program within the enterprise network 90 installs an executable dynamic runtime engine application on the user device 20. When the dynamic runtime engine application is executed, it initiates communication with the system 80. In response to execution of the dynamic runtime engine application at the enterprise network 90, the system 80 selects pre-defined codesets stored in its memory that will be required by the healthcare enterprise to automatically execute the modeled integration process, as shown at block 210. The system 80 selects codesets from all codesets stored in its memory as a function of the model, such as the elements selected by the user in creating the model, and as a function of the parameter/setting, etc. information provided by the user in step 206.

Accordingly, the system 80 receives via the website user input allowing the system 80 to search its database and select from various pre-stored code only those selected codesets, data, application templates, etc. required to build a customized software application for automatedly integrating the modeled business process. The appropriate application template may be selected as a function of the process modeled by the user. When the selected codesets are combined with the selected application template and the user information codeset, they collectively provide an executable customized software application for automatedly integrating the modeled business process. The system then transmits to the enterprise network 90 the generic executable application template stored in its memory, the codesets selected at block 210, and a codeset capturing the information provided by the user. In the example of FIG. 1, the application may be received and stored by either device 20 or the business process system 30. The application, whether executed at the user device 20 or the business process system 30, is then operable to exchange data between the business process system 30 and the trading partner system 60. For example, the process may be scheduled to execute periodically, such as every night, every 2 hours, etc., to exchange data. As described below, the inbound connector element 420 is configured to provide an MLLP server client that can continuously listen for incoming HL7 messages. Receipt of a message can trigger operation of downstream process components.

Figure 5:
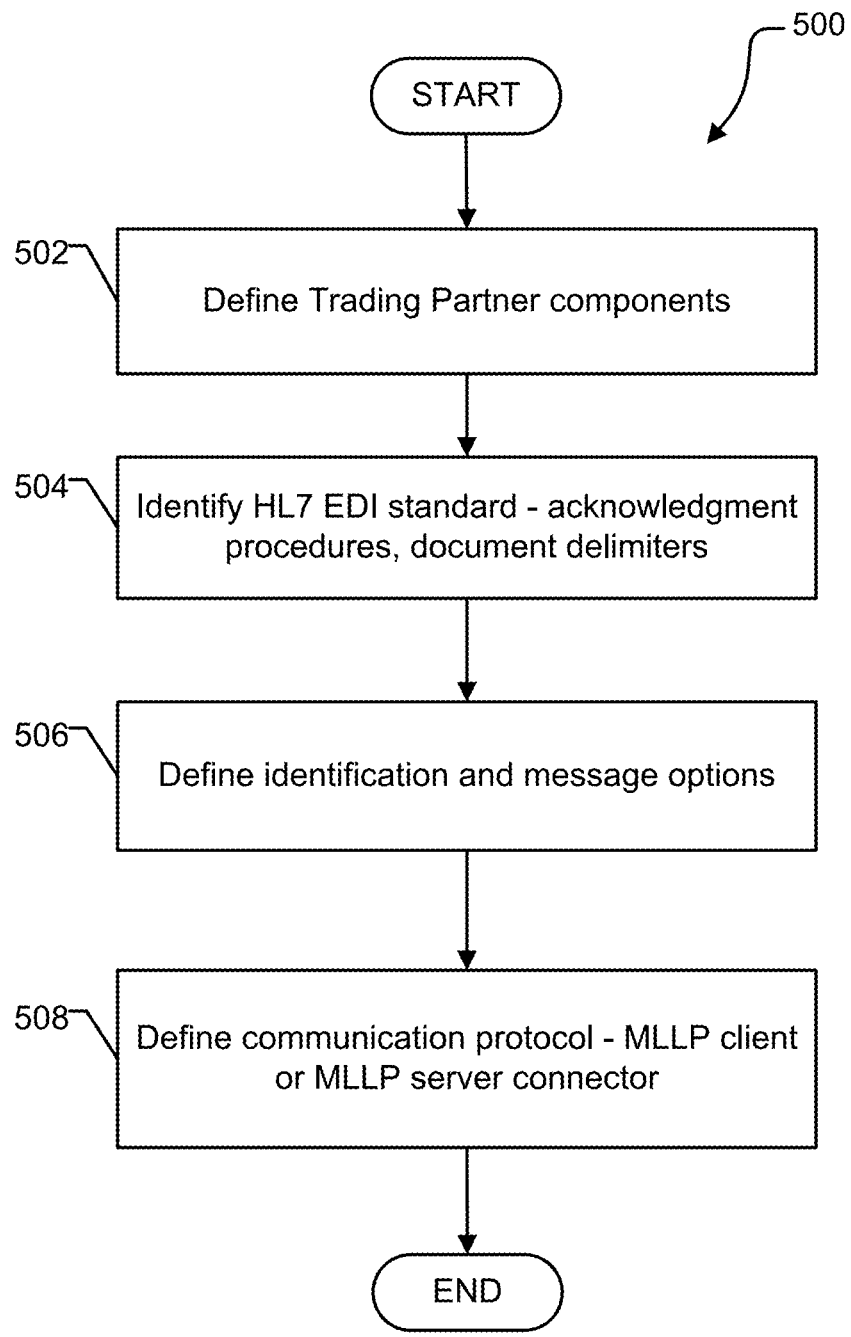
FIG. 5 is a flow diagram illustrating a method for defining and configuring a trading partner component included at an integration process model according to a specific embodiment of the present disclosure.

FIG. 5 shows a method 500 for defining and configuring a trading partner component included at an integration process model according to a specific embodiment of the present disclosure. The method begins at block 502 where a trading partner component is defined. For example, the inbound connector element 420 at FIG. 4 can be referred to as a start step, and a start step can be configured as a trading partner. A start step initiates operation of the downstream integration process. As disclosed herein, the inbound connector can be configured to provide a TCP/IP server node that is continuously listening for MLLP encapsulated HL7 message transmissions from a trading partner, such as the trading partner 60 at FIG. 1.

The method continues at block 504 where the trading partner is configured. The graphical interface at the automated software development system website can include a trading partner tab that is preconfigured to solicit configuration information specifically relating to an HL7 inbound server connector. The trading partner can be configured to process documents encoded using the HL7 EDI standard, in addition to other EDI document standards such as ASC X12, EDIFACT, and the like. An HL7 message is a human readable encoding syntax based on a collection of segments separated by one-character segment delimiters. Every message begins with a message header (MSH) segment that includes a field identifying the message type. Examples of message types include admissions, discharge, and transfers (ADT), acknowledgment (ACK), medical document management (MDM), to name a few. A message type, such as ADT, can be associated with a trigger event that identifies a specific type of admission, discharge, and transfers message. For example, an ADT message can include a trigger event value A01 to identify a patient admission message. Each message type and trigger event has a specific format, which may be shared by other message types, but is typically unique to a message type due to specific information that is associated with the message type. A segment includes one or more data elements. A data element can include one or more fields referred to as composites, and composites can include multiple sub-composites. For example, the first data element of each segment contains a three-character segment identifier. Each segment contains one specific category of information.

Additional trading partner configuration options include identifying message acknowledgement protocols, document delimiters, and the like. For example, a user can set the conditions under which message accept-level and application-level acknowledgments are required to be returned. An accept-level acknowledgment can include a synchronous reply notifying the sender of an HL7 message that the message was received, thereby releasing the sending system from any obligation to resend the message. An application-level acknowledgement is a message-dependent response to the initiator. For example, a message header of an incoming message can be parsed to determine what type of HL7 message has been received. Having determined the message type, an appropriate data profile can be used to verify that the message complies with a syntax specified by the profile. The integration can process the message and asynchronously respond to the sender based on the type of message received. A user also can specify delimiters that distinguish various portions of a message, such as file delimiters, segment terminators, composite and sub-composite delimiters, and the like.

The method continues at block 506 where a user of the development system can define identification and message options. These options correspond to fields in a message header segment (MSH segment) identifying the interchange sender or receiver. For example, the user can specify Sending Application (MSH-3) or the Receiving Application (MSH-5), which uniquely identifies the application within the enterprise. Another identification option includes a Sending Facility (MSH-4) or Receiving Facility (MSH-6), which is the address of one of several occurrences of the same application within the sending or receiving system. Identification options also include a Sending Network Address (MSH-24) or a Receiving Network Address (MSH-25). The fields can include a composite of a Namespace ID, a Universal ID, and a Universal ID Type. Message options include Processing ID and Processing Mode. The Processing ID sets the type of the system used for facilitating interchange, such as debugging, production, and training. The Processing Mode sets the interchange processing mode, such as not present, archive, restore from archive, initial load, and current processing.

The method continues at block 508 where a communication protocol used to send and receive documents is defined. An integration process for receiving and sending HL7 documents typically utilizes a MLLP server connector for receiving messages and a MLLP client connector for sending messages. MLLP communication settings can include providing an outbound client with a Host IP address and a Port value to identify a trading partner's listening MLLP server.

Figure 6:
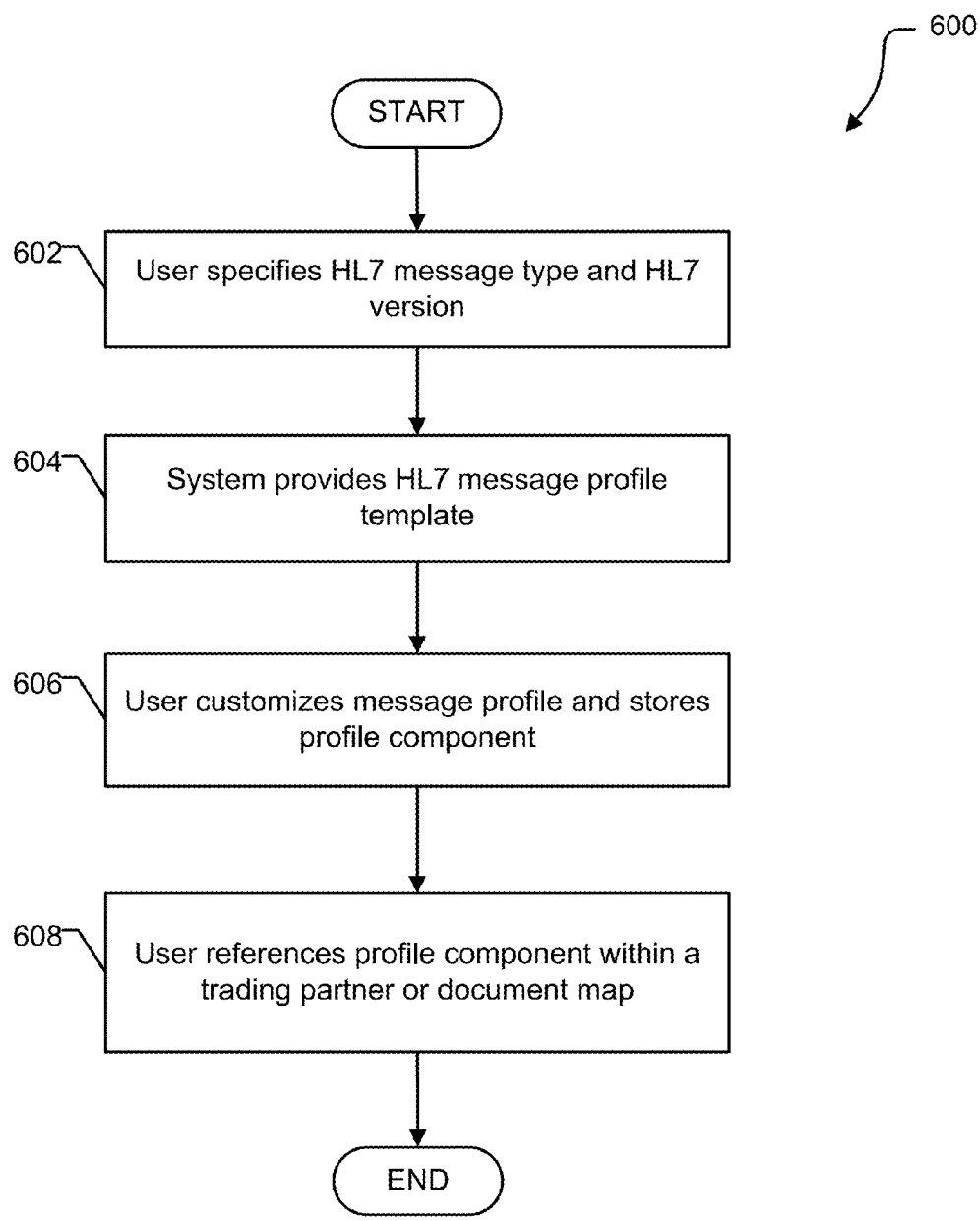
FIG. 6 is a flow diagram illustrating a method for generating and configuring a data profile according to a specific embodiment of the present disclosure.

FIG. 6 shows a method 600 for generating and configuring a data profile according to a specific embodiment of the present disclosure. The method begins at block 602 where a user specifies an HL7 message type and an HL7 version at a configuration menu provided at the GUI of the automated software development system. For example, the inbound connector element, such as the element 420 at FIG. 4 can represent a receiver that listens for incoming HL7 messages. The method continues at block 604 where the development system generates an HL7 message profile template based on the information received at the block 602. During configuration of the inbound connector element, the development system can present the user with one or more dialog boxes, menus, and the like, with which the user can define the operation of the receiver. One configuration prompt may solicit the user to specify one or more types of HL7 messages that the receiver is configured to receive. For example, a user may select an ADT message class from a menu of available HL7 message classes. In response, the system can provide another menu from which the user can select a particular type of ADT message, such as an ADT_A02 message type corresponding to a patient transfer request.

The method continues at block 606 where a user can customize the message profile template and create a profile component. For example, two trading partners may elect to customize a particular message type to include a fewer number of segments, additional composite fields, and the like. One type of HL7 message profile customization includes the use of Z-segments. Z-segments can be inserted anywhere in an HL7 message. For example, a Z-segment can be used to convey insurance information, placed at the end of an HL7 message. The method continues at block 608 where the user can reference the stored profile component during configuration of one or more visual elements. For example, a start step representing an incoming trading partner can reference a profile component. The start step can refer to the profile to parse and validate incoming HL7 messages. Similarly, a data transformation step can reference profile components to translate information from one document to another document, each document having a format defined by a corresponding data profile. For example, a user can specify a mapping between individual fields defined in respective data profiles associated with each document.

Figure 7:
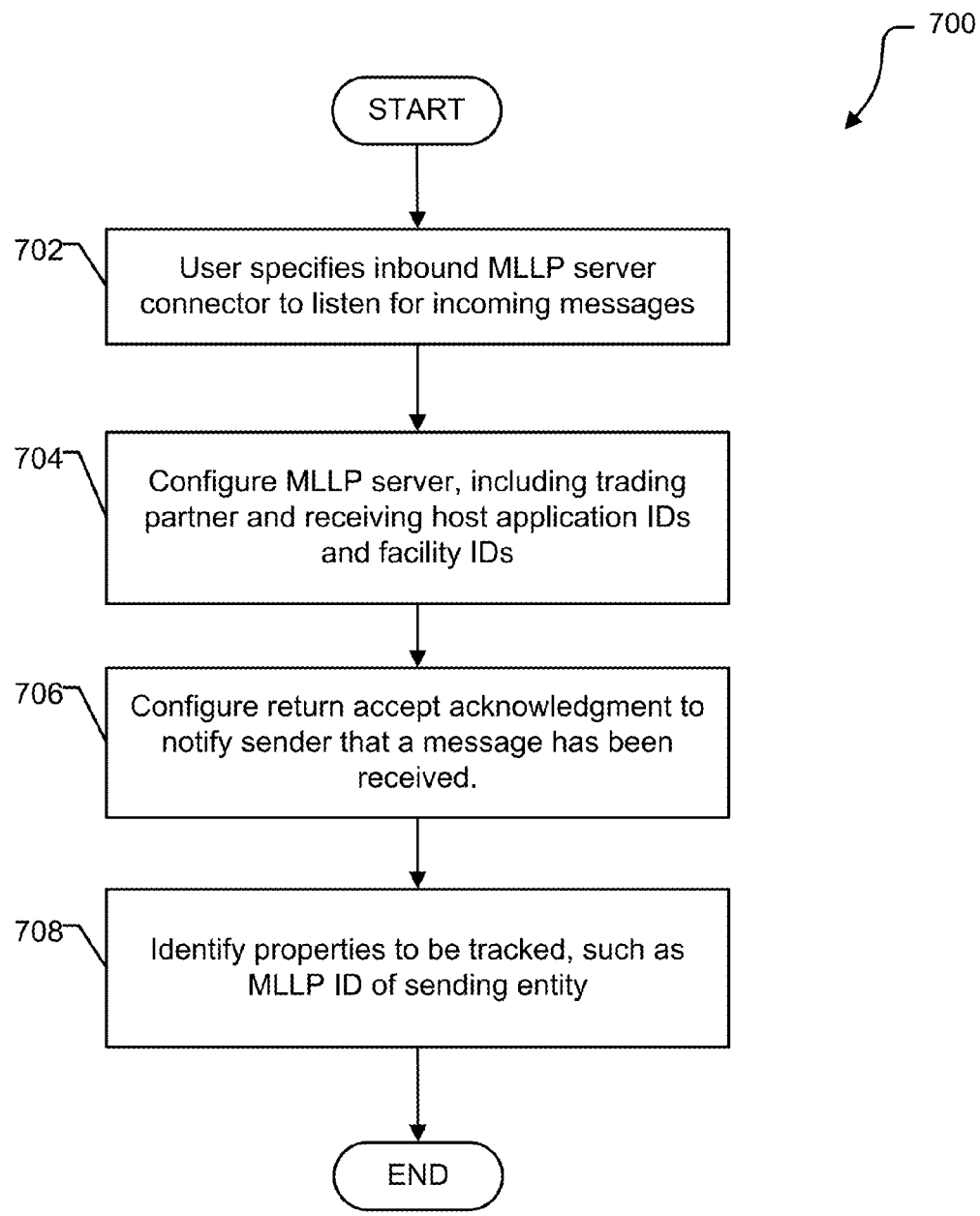
FIG. 7 is a flow diagram illustrating a method for generating and configuring an inbound MLLP server connector according to a specific embodiment of the present disclosure.

FIG. 7 shows a method 700 for generating and configuring an inbound MLLP server connector according to a specific embodiment of the present disclosure. The inbound server provides a TCP/IP server node operable to listen for and receive MLLP encoded HL7 messages. The method begins at block 702 where a user configures a start step to represent an inbound MLLP server that listens for incoming HL7 messages. As described above, the start step can be associated with a trading partner. The trading partner must be provided with a static IP address and port value to specify where to deliver HL7 messages. This address information may correspond to the server at which the custom software application is installed, or to a suitable network gateway device that routes incoming messages to the MLLP server. The method continues at block 704 where the inbound MLLP server is configured. Configuration parameters can include a sending partner's application ID and facility ID, the receiving partner's application ID and facility ID, transmission options, and other process options. A network ID also may be required. The method continues at block 706 where a user configures an accept acknowledgment protocol that determines how to notify a sender when a message is received. The method continues at block 708 where a user identifies properties to be tracked during operation of the integration process application program. For example, the MLLP server can be configured to record, during operation, an MLLP ID of the sending entity, an MLLP ID of the receiving entity, an MLLP message subject, an MLLP message ID, a filename of the inbound document, and the like. In an embodiment, the tracked information can be transmitted to the service provider 80 and made available to the client along with other process analytics information using an integration process monitor application.

Figure 8:
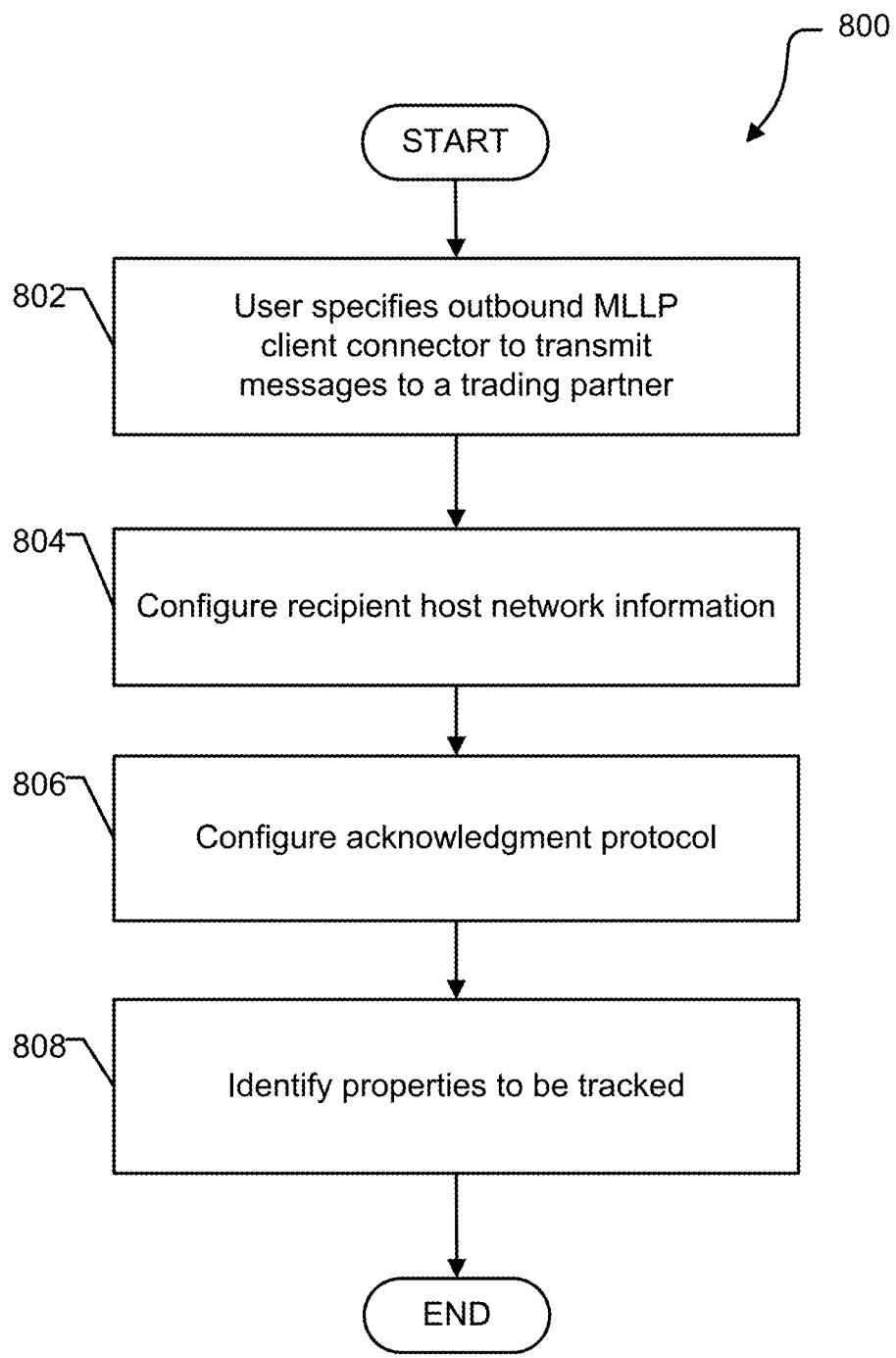
FIG. 8 is a flow diagram illustrating a method for generating and configuring an outbound MLLP server connector according to a specific embodiment of the present disclosure.

FIG. 8 shows a method 800 for generating and configuring an outbound MLLP server connector according to a specific embodiment of the present disclosure. The outbound server provides a TCP/IP client node operable to transmit MLLP encoded HL7 messages to a trading partner. The method begins at block 802 where a user specifies a MLLP client connector. The client connector represents one or more codesets that will be included at the custom software application. The method continues at block 804 where the user configures the outbound client connector, specifying a static IP address and port value corresponding to the trading partner that is to receive HL7 messages. Other configuration information can include a send timeout value specifying a number of seconds before the connection times out waiting for the completion of a send operation, a receive timeout value specifying a number of seconds before the connection times out waiting for a ACK functional acknowledgment message from the receiving MLLP server, and a value indicating a maximum number of times the outbound client will retry a send operation that is timing out. The method continues at block 806 where the user specifies a desired acknowledgement protocol. For example, the outbound client can be configured to wait for the listening MLLP server to issue an ACK functional acknowledgment message. The trading partner must be provided with an IP address and port value at which to send a response acknowledgment. The method continues at block 808 where a user identifies properties to be tracked during operation of the integration process application program. The types of information to be tracked and other operation can be similar to that described above with reference to block 708 at FIG. 7.

Accordingly, using only a web browser, a user can automate integration processes for a specific enterprise, and then download the dynamic runtime engine application containing just the enterprise-specific processes and run this dynamic runtime engine on the enterprise's existing infrastructure. The dynamic runtime application is a lightweight application because unlike generic software applications, the dynamic runtime engine is able to install just the software components that are needed to execute the integration processes for a particular enterprise. Conventional integration server software applications have been distributed as a pre-built application on a series of CD's, where it must be manually installed, and manually upgraded as new versions are made available by the software vendor.

It should be noted that the disclosed method and system is not merely a conventional client/server arrangement. Instead, the software application to be executed within a specific enterprise system is custom-built using pre-built codesets selected as a function of user input, and user input, in view of specific enterprise system attributes, and is "pulled" from the system 80 by the dynamic runtime engine that is installed in the user device 20 or the system 30. This requires the software application to be designed and built under the assumption that it will not be executed in the same network in which it was built. It should be further noted that although the example above discusses business-to-business integration between applications of a trading partner system and an enterprise system in different networks, that the present disclosure is equally applicable to integrate between different applications within the enterprise system, such as for application integration. For example, a customized business integration software application may be built as described herein for use among customer relationship management, inventory control, purchasing, accounting or other enterprise systems within the enterprise system network. Also, the present disclosure is equally applicable to integrate between applications within the enterprise system and applications running outside of the enterprise system, commonly referred to as Software as a Service solution or SaaS integration. For example, a customized business integration software application may be built as described herein for storing customer information, and this data must be synchronized with a customer relationship management application.

Figure 9:
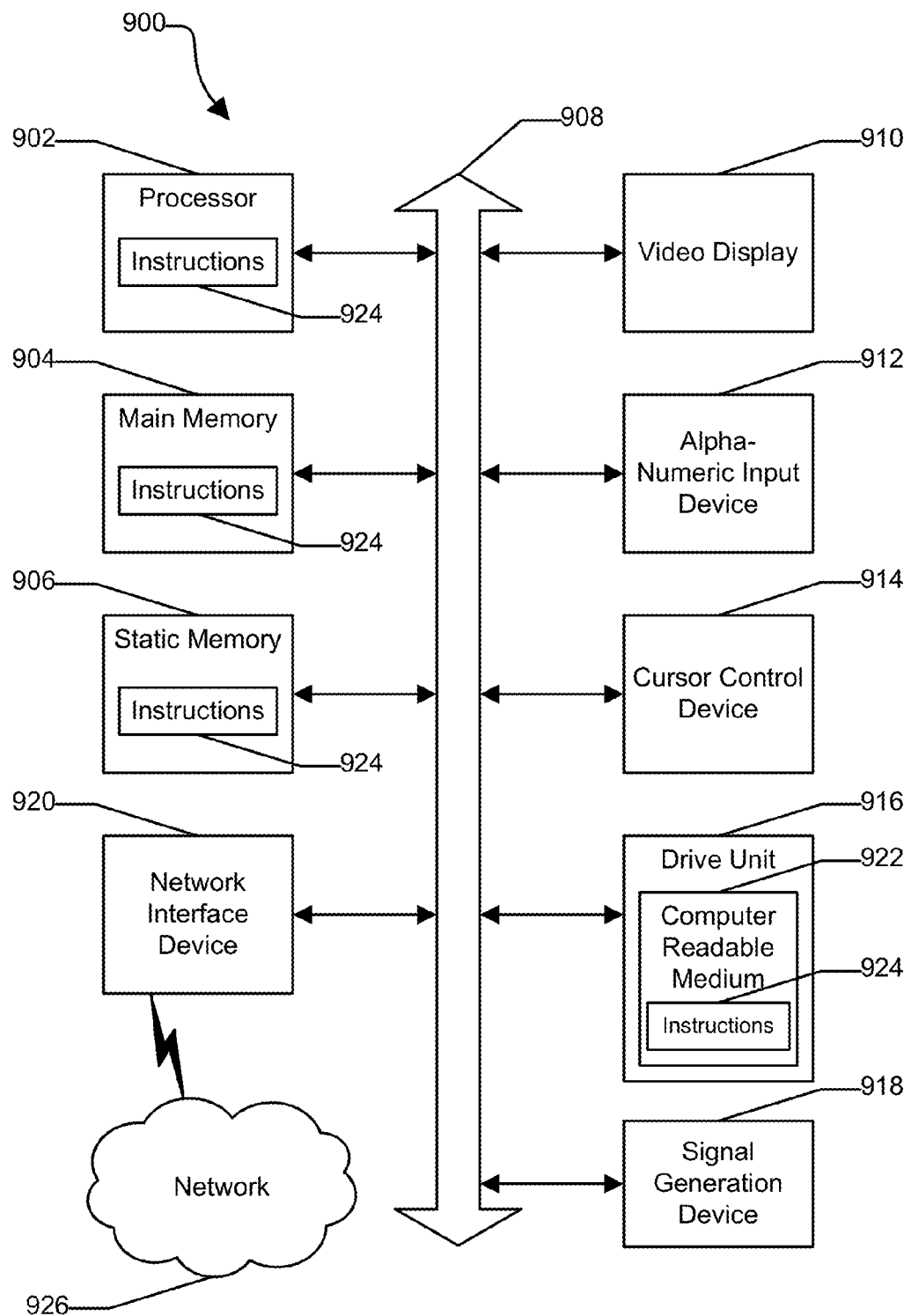
FIG. 9 illustrates a block diagram of an information handling system according to and embodiment of the present disclosure.

FIG. 9 shows an information handling system 900 capable of administering each of the specific embodiments of the present disclosure. The information handling system 900 can represent the user device 20, the systems 30 and 80, systems at trading partners 60 and 70, and other systems and devices included at the business network 10 of FIG. 1. The information handling system 900 may include a processor 902 such as a central processing unit (CPU), a graphics processing unit (GPU), or both. Moreover, the information handling system 900 can include a main memory 904 and a static memory 906 that can communicate with each other via a bus 908. As shown, the information handling system 900 may further include a video display unit 910, such as a liquid crystal display (LCD), an organic light emitting diode (OLED), a flat panel display, a solid state display, or a cathode ray tube (CRT). Additionally, the information handling system 900 may include an input device 912, such as a keyboard, and a cursor control device 914, such as a mouse. The information handling system 900 can also include a disk drive unit 916, a signal generation device 918, such as a speaker or remote control, and a network interface device 920. The information handling system 900 can represent a server device whose resources can be shared by multiple client devices, or it can represent an individual client device, such as a desktop personal computer.

The information handling system 900 can include a set of instructions that can be executed to cause the computer system to perform any one or more of the methods or computer based functions disclosed herein. The computer system 900 may operate as a standalone device or may be connected such as using a network, to other computer systems or peripheral devices.

In a networked deployment, the information handling system 900 may operate in the capacity of a server or as a client user computer in a server-client user network environment, or as a peer computer system in a peer-to-peer (or distributed) network environment. The information handling system 900 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 900 can be implemented using electronic devices that provide voice, video or data communication. Further, while a single information handling system 900 is illustrated, the term "system" shall also be taken to include any collection of systems or sub-systems that individually or jointly execute a set, or multiple sets, of instructions to perform one or more computer functions.

The disk drive unit 916 may include a computer-readable medium 922 in which one or more sets of instructions 924 such as software can be embedded. Further, the instructions 924 may embody one or more of the methods or logic as described herein. In a particular embodiment, the instructions 924 may reside completely, or at least partially, within the main memory 904, the static memory 906, and/or within the processor 902 during execution by the information handling system 900. The main memory 904 and the processor 902 also may include computer-readable media. The network interface device 920 can provide connectivity to a network 926, such as a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 924 or receives and executes instructions 924 responsive to a propagated signal; so that a device connected to a network 926 can communicate voice, video or data over the network 926. Further, the instructions 924 may be transmitted or received over the network 926 via the network interface device 920.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A computer-implemented method for automated creation of a customized software application, the method comprising:
provide, at a service provider, a graphical user interface (GUI) to an automated software development system, the GUI accessible using an Internet web browser including:
a menu identifying a collection of visual modeling elements, each element associated with a respective codeset; and
a visual design environment at which selected visual modeling elements are instantiated and interconnected by a user of the development system to generate a visual model representing a business integration process;
providing a first configuration dialog interface at the GUI for soliciting from the user first information indicating a Health Level Seven (HL7) version and an HL7 message type;
determining an HL7 electronic data interchange (EDI) document profile defining a document schema and a set of data elements included at an HL7 message document, the HL7 document profile corresponding to the HL7 version and the HL7 message type;
generating, using the computer, a profile codeset based on the HL7 document profile; and
providing the customized software application for installation at an enterprise, the application comprising a collection of codesets including the profile codeset.

2. The method of claim 1, further comprising:
providing a second configuration dialog interface at the GUI to facilitate revising the HL7 document profile.

3. The method of claim 1, wherein the customized software application includes a Minimal Lower Layer Protocol (MLLP) receiver, and HL7 messages received at the receiver during operation of the application are parsed and validated based on the HL7 document profile.

4. The method of claim 1, further comprising:
providing a second configuration dialog in response to a user instantiating a first element of the collection of visual modeling elements at the visual design environment, the first element representing a communications receiver to receive HL7 messages transported by Minimal Lower Layer Protocol (MLLP) and transmitted via Transmission Control Protocol/Internet Protocol (TCP/IP); and
generating a communications receiver codeset based on configuration information provided at the second configuration dialog, the codeset included at the collection of codesets.

5. The method of claim 4, further comprising:
receiving, via the second configuration dialog, rules governing responses by the receiver to acknowledge receipt of an incoming HL7 message.

6. The method of claim 4, further comprising:
receiving, via the second configuration dialog, properties to be tracked during operation of the communications receiver, the properties including a MLLP ID identifying a source of a message received at the receiver.

7. The method of claim 1, further comprising:
providing a second configuration dialog in response to a user instantiating a first element of the collection of visual modeling elements at the visual design environment, the first element representing a communications transmitter to transmit HL7 messages transported by Minimal Lower Layer Protocol (MLLP) and transmitted via Transmission Control Protocol/Internet Protocol (TCP/IP); and
generating a communications transmitter codeset based on configuration information provided at the second configuration dialog, the codeset included at the collection of codesets.

8. The method of claim 7, further comprising:
receiving, via the second configuration dialog, a static Internet Protocol (IP) address and port value assigned to an entity to receive transmitted HL7 messages.

9. The method of claim 7, further comprising:
receiving, via the second configuration dialog, properties to be tracked during operation of the communications transmitter, the properties including a MLLP message ID identifying a message transmitted by the transmitter.

10. The method of claim 9, further comprising:
receiving, via the second configuration dialog, information identifying whether the transmitter waits for an acknowledgement from a message recipient prior to initiating transmission of another HL7 message.

11. The method of claim 1, further comprising:
providing a configuration dialog for configuring operation of a document translation process module of the customized software application, the module to transfer information included at a first document complying with a first document profile to a second document complying with a second and different document profile, wherein the first or the second profile is the HL7 document profile.

12. An automated software development system for creating a customized software application, the system comprising:
a memory;
a microprocessor operatively connected to the memory; and
code stored in the memory and executable by the microprocessor to:
provide, at a service provider, a graphical user interface (GUI) to an automated software development system, the graphical user interface accessible using an Internet web browser and including:
a menu identifying a collection of visual modeling elements, each element associated with a respective codeset; and
a visual design environment at which selected visual modeling elements are instantiated and interconnected by a user of the development system to generate a visual model representing a business integration process;

provide a first configuration dialog interface at the GUI for soliciting from the user first information indicating a Health Level Seven (HL7) version and an HL7 message type;

determine an HL7 electronic data interchange (EDI) document profile defining a document schema and a set of data elements included at an HL7 message document, the HL7 document profile corresponding to the HL7 version and the HL7 message type;

generate a profile codeset based on the HL7 document profile; and provide the customized software application for installation at an enterprise, the application comprising a collection of codesets including the profile codeset.

13. The system of claim 12, further comprising computer-readable code stored in the memory to:

provide a second configuration dialog interface at the GUI to facilitate revising the HL7 document profile.

14. The system of claim 12, further comprising computer-readable program code stored in the memory and executable by the microprocessor to:

provide a second configuration dialog in response to a user instantiating a first element of the collection of visual modeling elements at the visual design environment, the first element representing a communications receiver to receive HL7 messages transported by Minimal Lower Layer Protocol (MLLP) and transmitted via Transmission Control Protocol/Internet Protocol (TCP/IP), wherein HL7 messages received at the receiver during operation of the application are parsed and validated based on the HL7 document profile; and generate a communications receiver codeset based on configuration information provided at the second configuration dialog, the codeset included at the collection of codesets.

15. The system of claim 12, further comprising computer-readable program code stored in the memory and executable by the microprocessor to:

provide a second configuration dialog in response to a user instantiating a first element of the collection of visual modeling elements at the visual design environment, the first element representing a communications transmitter to transmit HL7 messages transported by Minimal Lower Layer Protocol (MLLP) and transmitted via Transmission Control Protocol/Internet Protocol (TCP/IP); and generate a communications transmitter codeset based on configuration information provided at the second configuration dialog, the codeset included at the collection of codesets.

16. The system of claim 12, further comprising computer-readable program code stored in the memory and executable by the microprocessor to:

provide a configuration dialog for configuring operation of a document translation process module of the customized software application, the module to transfer information included at a first document complying with a first document profile to a second document complying with a second and different document profile, wherein the first or the second profile is the HL7 document profile.

17. A computer program product for automating creation of a customized software application, the computer program product comprising a non-transitory computer-readable storage medium having computer-readable program code embodied in the medium, the computer-readable program code including:

computer-readable program code that provides, at a service provider, a graphical user interface (GUI) to an automated software development system, the GUI accessible using an Internet web browser and comprising:

a menu identifying a collection of visual modeling elements, each element associated with a respective codeset; and a visual design environment at which selected visual modeling elements are instantiated and interconnected by a user of the development system to generate a visual model representing a business integration process;

computer-readable program code that provides a first configuration dialog interface at the GUI for soliciting from the user first information indicating a Health Level Seven (HL7) version and an HL7 message type;

computer-readable program code that determines an HL7 electronic data interchange (EDI) document profile defining a document schema and a set of data elements included at an HL7 message document, the HL7 document profile corresponding to the HL7 version and the HL7 message type;

computer-readable program code that generates a profile codeset based on the HL7 document profile; and computer-readable program code that provides the customized software application for installation at an enterprise, the application comprising a collection of codesets including the profile codeset.

18. The computer program product of claim 17, further comprising computer-readable code that:

provides a second configuration dialog interface at the GUI to facilitate revising the HL7 document profile.

19. The computer program product of claim 17, further comprising computer-readable code that:

provides a second configuration dialog in response to a user instantiating a first element of the collection of visual modeling elements at the visual design environment, the first element representing a communications receiver to receive HL7 messages transported by Minimal Lower Layer Protocol (MLLP) and transmitted via Transmission Control Protocol/Internet Protocol (TCP/IP), wherein HL7 messages received at the receiver during operation of the application are parsed and validated based on the HL7 document profile;

generates a communications receiver codeset based on configuration information provided at the second configuration dialog, the codeset included at the collection of codesets.

20. The computer program product of claim 17, further comprising computer-readable code that:

provides a second configuration dialog in response to a user instantiating a first element of the collection of visual modeling elements at the visual design environment, the first element representing a communications transmitter to transmit HL7 messages transported by Minimal Lower Layer Protocol (MLLP) and transmitted via Transmission Control Protocol/Internet Protocol (TCP/IP);

generates a communications transmitter codeset based on configuration information provided at the second configuration dialog, the codeset included at the collection of codesets.

* * * * *